L. C. NICHOLSON.
CIRCUIT CONTROLLING APPARATUS.
APPLICATION FILED JULY 22, 1908.
959,787.
Patented May 31, 1910.
3 SHEETS—SHEET 1.
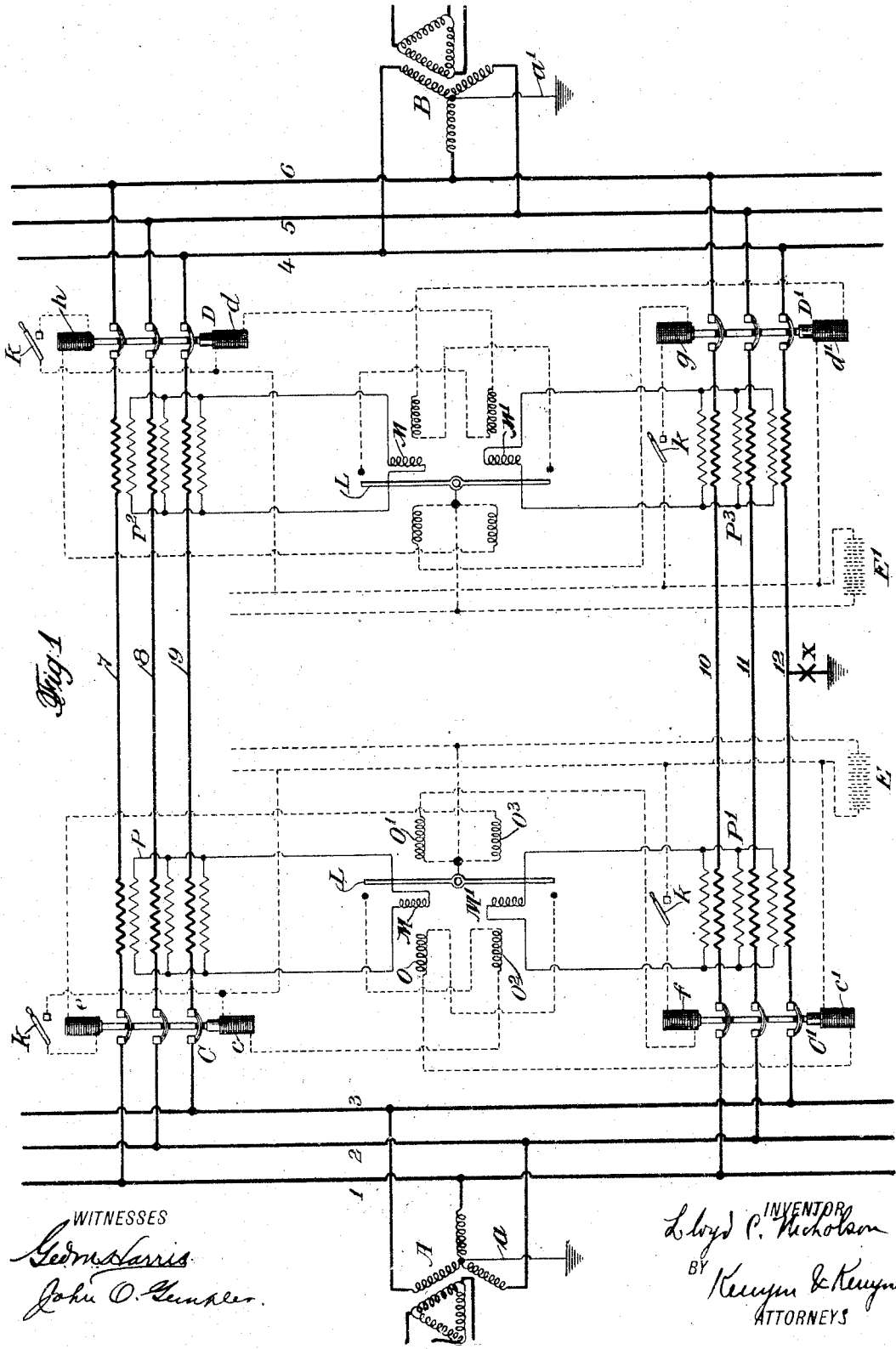

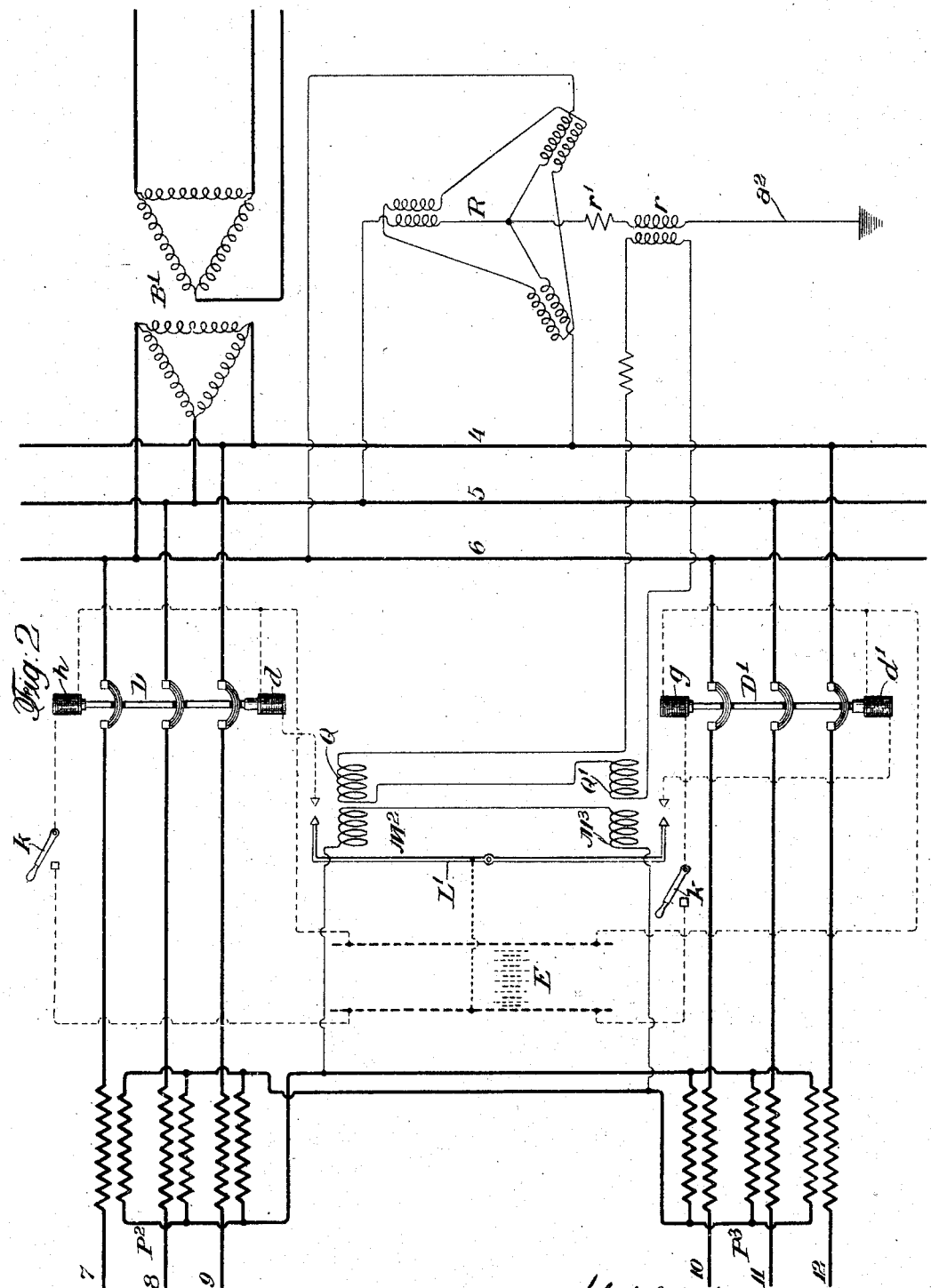

L. C. NICHOLSON.
CIRCUIT CONTROLLING APPARATUS.
APPLICATION FILED JULY 22, 1908.
959,787.
Patented May 31, 1910.
3 SHEETS—SHEET 3.
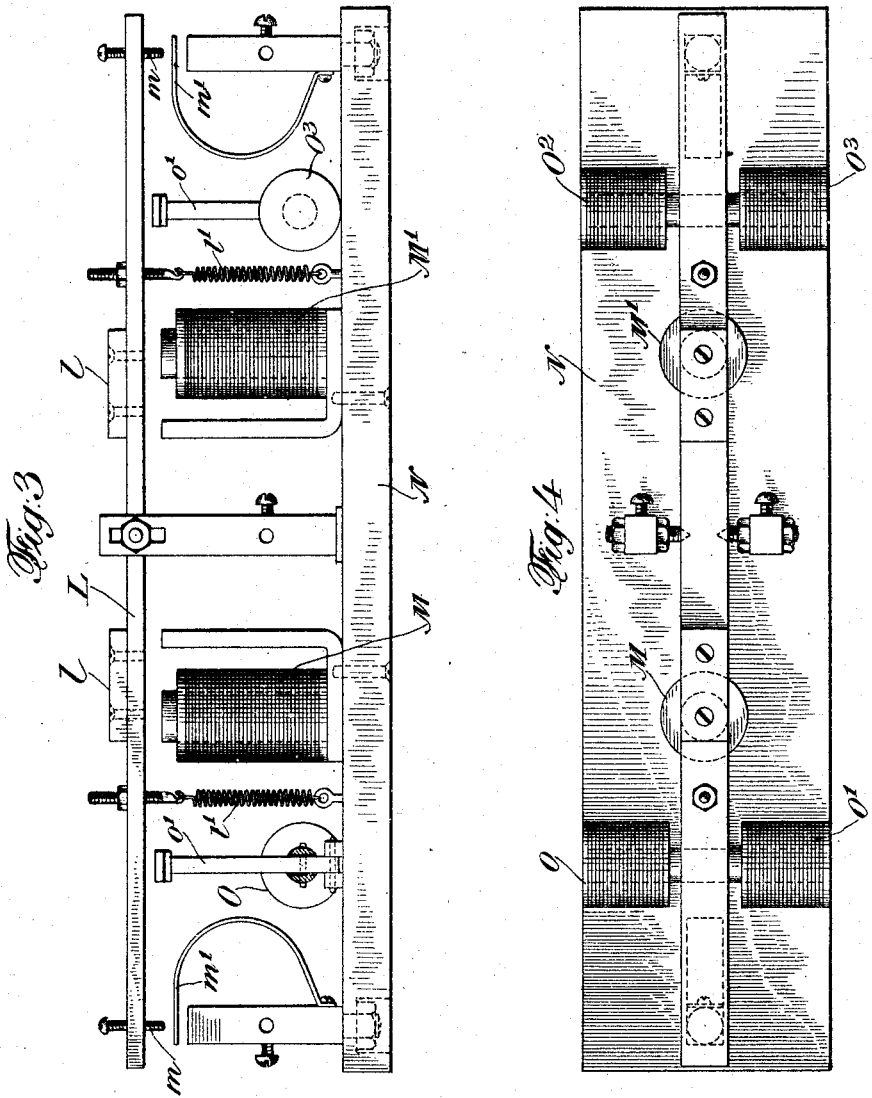
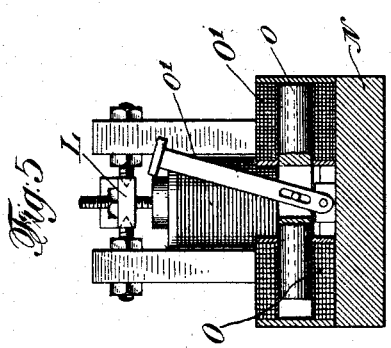
WITNESSES
INVENTOR
Lloyd C. Nicholson
BY Kenyon & Kenyon
ATTORNEYS

UNITED STATES PATENT OFFICE.

LLOYD CARLTON NICHOLSON, OF BUFFALO, NEW YORK.

CIRCUIT-CONTROLLING APPARATUS.

959,787.  Specification of Letters Patent.  Patented May 31, 1910.

Application filed July 22, 1908. Serial No. 444,711.

*To all whom it may concern:*

Be it known that I, LLOYD C. NICHOLSON, a citizen of the United States, and a resident of Buffalo, county of Erie, State of New York, have invented certain new and useful Improvements in Circuit-Controlling Apparatus, of which the following is a specification.

My invention relates to the protection of transmission lines from the results of a fault developed on any conductor of the line.

My invention is especially applicable to polyphase transmission lines, although some features of my invention have utility apart from their use on a polyphase transmission line.

It is customary in transmitting power of high tension over considerable distances to supply two or more independent transmission lines connected together both at the power and at the receiving ends of the line, thus enabling either line to be employed in case the other or others are put out of commission. It is desirable to disconnect both ends of a transmission line upon which the ground occurs and to do so with as little injury or strain to the power station as possible.

One object of my invention is to provide a system having only two parallel transmission lines connecting the power and receiving stations and so arranged as to disconnect a faulty transmission line at both ends of the line immediately upon the development of a fault in the line and regardless of the position of the fault. Certain means for disconnecting a faulty line have been heretofore proposed but they fail in practice unless more than two transmission lines are provided, or unless there is a generating station at each end of the line.

Another object of my invention is to provide apparatus for automatically cutting out the faulty line that will act positively and certainly regardless of any unequal division of the working load between the two transmission lines and regardless of whether branch load lines are connected to one or other transmission line between the power and receiving stations, and regardless of any differences that may exist in the lengths of the different transmission lines or their conductive capacities.

More specific objects of my invention will appear hereinafter in the course of the description of the illustrated embodiments of my invention.

In accordance with my invention I provide two parallel polyphase transmission lines connected together at the power and receiving stations and in each line I place two circuit breakers, one at or near each of the stations. At or near each station I also provide apparatus in each transmission line with circuits extending therefrom, which apparatus supplies no current to said circuits when the lines are in normal condition, but means are provided whereby upon development of a ground upon a conductor of either line the flow of current thereto causes the apparatus in each line to supply current to the circuit connected to it. I use these currents in combination in such a way as to cause them act upon the circuit breaker of the faulty line to open the same without opening the circuit breaker of the other line.

In order that the development of a ground will cause a current flow to ground, a grounded neutral is provided at the power station. The apparatus for supplying the currents for actuating circuit breakers consists of series transformers whose secondaries are connected in parallel, there being in each line and at each station a series transformer in each conductor of the line. The several secondaries connected in parallel ordinarily provide no current to the circuit external to them because it is well known that the algebraic sum of the currents of a polyphase transmission line is equal to zero. When, however, a ground develops on one of the conductors the secondaries of each set of transformers supply a current to the circuit external to them.

For simplification I will hereinafter refer to the current, that is a current corresponding to the algebraic sum of the currents in the three conductors, as a neutral current. By using these currents coöperatively upon apparatus in operative relation with both circuit breakers I am enabled to cause the apparatus to select the faulty circuit breaker and open it without affecting the other. The two currents thus produced may be made to coöperate to effect this object either by opposing the strength of one current to the strength of the other current, or by combining said currents and causing their sum to react with a current having a substantially fixed phase relation to that of the normal phase of the faulty conductor.

The first form of my invention, namely, where the strengths of the two currents are opposed, can be embodied in an extremely simple and effective apparatus and is one which I prefer to use at the power end of the line in all cases, although I do not intend to limit myself to the use of this form of my invention at the power end. When this form is used at the power end, substantially different strengths of current will be developed in the two sets of series transformers provided the fault is near enough to the power end so that the impedance of the two paths to the fault is substantially different. If the fault is so located as to cause the impedance of the two paths to the fault to be very nearly equal, then the circuit breaker at the power end will ordinarily not be opened until after the circuit breaker has opened at the receiving end. After this has occurred the entire current to the fault flows through the series transformer at the power end of the faulty conductor, thus producing a heavy neutral current in the circuit of the secondaries of the transformers of which this is one, whereas there will be no current in the circuit of the secondaries of the transformers in the other transmission line. In practice I achieve this result by providing a normally balanced relay acted upon oppositely by two coils adjacent to armatures carried on the relay and movable with the relay, which coils are respectively connected in the external circuits of the series transformers of the two lines. I provide connections from this balanced relay to the tripping circuits of two circuit breakers so that a movement of the relay in one direction will actuate one circuit breaker and a movement of the relay in the other direction will actuate the other circuit breaker. I also provide means whereby the movement of the relay to one of these operative positions blocks the relay from movement to its other operative position until the circuit breaker has again been closed. This same relay may also be employed at the receiving end of the line to actuate the two circuit breakers at that end. In this case, however, where only two transmission lines are supplied additional means must be supplied to cause the two neutral currents to act differently upon the relay since the current flowing from the power station to ground will cause the two neutral currents at the receiving end to be equal in strength. Where this form of relay is employed it is necessary that the development of the fault shall cause two neutral currents at the receiving end which are different in strength and this I effect by supplying a means for producing a flow of current to the ground through the receiving station, the electro-motive-force of which current causes an added current to flow through one of the transformers of the receiving station, while opposing the flow of current through the other of said transformers, the two transformers being those in the faulty conductor and the corresponding conductor of the other line.

Whatever the specific form of relay employed at the receiving end, it is necessary, because the current to ground from the power end produces equal neutral currents from the series transformers at the receiving end, to provide an additional current which shall so coöperate with the current to ground from the power end through the receiving station as to make the two neutral currents from the series transformers at the receiving station act differently upon the relay. In the first form of my invention, already briefly described, this different action is effected because the additional current makes the strength of one of the opposing currents of the relay greater than that of the other.

In another form of my broad invention I provide the series transformers with their secondaries connected as before, the two sets of transformers being reversely connected to a single circuit. Across this circuit I connect a coil or coils which will receive the sum of the currents supplied to the external circuit by these transformers. In this case the relative phase of the current developed in this coil or coils when a ground occurs depends upon which conductor contains the fault. With any given phase of the grounded current the current in the coil or coils will be either substantially of the same phase or of relatively opposite direction. In this case, therefore, it is only necessary to provide a second current which has a definite phase relation to the grounded current and to provide means whereby this second current may coact with the current in the coil or coils in order to cause the operation of a relay in one direction or another to produce the actuation of the proper circuit breaker. The current in the coil or coils connected to the sets of series transformers has a phase and direction dependent upon the phase that is grounded and the line containing the grounded conductor. The second current supplied to a co-acting coil or coils has a phase and direction that is definitely related to the phase and direction of the grounded current and is not different whether one or the other line contains a grounded conductor. This second current may be supplied in various ways. Whether the form of relay at the receiving end be one dependent upon the opposing strength of one of the neutral currents of the series transformers to the strength of the neutral currents of the other transformers or whether it be one dependent upon the opposing or combined current from the cross-connected sets of secondaries of the series transformers, the second current that is to be supplied from the receiving end must have a definite phase relation with the ground current. With either form of relay this second current may be supplied by providing as one of the power transformers at the receiving station a set of transformers having star connected primaries with a grounded neutral, and the secondaries connected in delta. In this case, through a retransformation, a current will be generated in the grounded primary and if the apparatus is properly designed, this current flowing through the faulty conductor at the receiving station to the fault and hence through the ground to the neutral at the receiving station will cause a neutral current from the series transformers of the faulty line at the receiving station to be greater than that in the neutral of the series transformers of the other line. A series transformer may be supplied in the grounded neutral at the receiving station, the secondary of which supplies the current in the same phase as that of the grounded conductor, which current may be used in various ways to effect the proper operation of the relay, as for example, by supplying coils which co-act magnetically with those supplied by the series transformers at the receiving station.

I have illustrated my invention in the accompanying drawings in which—

Figure 1 is a diagram illustrating a power station and a receiving station and connected by two transmission lines and containing apparatus illustrating one embodiment of my invention. Fig. 2 is a diagram illustrating a modified form of my invention at the receiving station. Figs. 3, 4, and 5 are respectively side, top and end views of the relay used at both stations in the system of Fig. 1.

In the present application I have shown and will describe the specific form of my invention illustrated in Fig. 2 for the purpose of illustrating the scope of my present invention, but I do not make any claim to this specific embodiment as this forms in part the subject matter of another application filed on an even date herewith.

Referring to Fig. 1, A indicates three transformers at the power station supplying a three phase current to the three station buses 1, 2, 3. The star connected secondaries have a neutral a connected to ground as indicated. 4, 5, 6 are the buses at the receiving station which may be and ordinarily are in such systems a number of miles distant from the power station. The power and receiving stations are connected by the transmission lines 7, 8, 9 and 10, 11, 12, which are tied together at each end by the buses.

B represents a set of power transformers at the receiving end, having their primaries star connected and their secondaries delta connected. C and C' represent circuit breakers in the power station adapted to disconnect the respective lines from the buses in the power station. D and D' are similar circuit breakers in the receiving station adapted to disconnect the other ends of the transmission lines from the receiving station buses. E and E' indicate batteries constituting sources of power respectively from the power and receiving stations for supplying current to tripping and closing circuits of the circuit breakers, these circuits being represented by broken lines. $c$, $c'$, $d$ and $d'$ represent the tripping coils of the four circuit breakers, the circuit breakers being actuated to open the circuit when their respective tripping coils are energized by the closure of the tripping circuit. $e$, $f$, $g$ and $h$ are coils for closing the circuit breakers, these coils being in circuits connected to the batteries and controlled by the hand switches $k$.

The relay used at both ends in Fig. 1 is structurally illustrated in Figs. 3 to 5. This relay has a pivoted arm L carrying iron armatures $l$, the arm being pivoted in the center and normally balanced between the opposing springs $l'$. This arm is acted upon oppositely by coils M, M' of electro-magnets suitably supported upon base N below the armatures $l$. If substantially unequal currents are supplied to these coils M, M', the one having the greater current will attract its armature and move the arm in one direction or another from its balanced position. By doing so one of the tripping circuits is closed between one of the contacts $m$ carried at the ends of the arm and the spring $m'$ suitably supported from the base N.

O, O', $O^2$ and $O^3$ are coils for operating stops for the arm L, each pair (O and O'; $O^2$ and $O^3$) of coils being adapted to act oppositely upon one of the common cores $o$ each of which engages a pivoted stop or blocking member $o'$. Each common core with its stop $o'$ has two positions. When the setting coil is energized the stop is thrown to a vertical position to block arm L, and when its releasing coil is energized it is thrown to an inclined position, permitting said arm to move in either direction, the stop remaining in its last operated position until again positively moved. Coils O and $O^2$ are in the respective tripping circuits so that when coil M, for example, has attracted its armature, closing the tripping circuit of the coil $c$ to open circuit breaker C, then coil $O^2$ at the opposite end of the relay operates upon its locking arm $o'$ to pull the arm to the vertical position and preventing the movement of the relay in the direction to open circuit breaker C' after circuit breaker C has opened. This would otherwise take place because after circuit breaker C is opened and before the circuit breaker D opens (provided the fault is in such a location as to cause C to open before D) then all the current to ground will pass through the line containing circuit breaker C'. In the same way if the fault has been one in the conductors 10, 11, 12 causing magnet M' to operate the relay to open circuit breaker C', the movement of the relay energizes coil O and causes it to raise its blocking arm o'. The blocking arms o' are moved from under the arm L so as to unlock the same by the coils O', O³ which are respectively in the closing circuits of the closing coils f, e, whereby when the fault has been repaired and the circuit breaker has again closed the stop is tilted and arm L is free to move in response to the energization of either of the coils M or M'.

The coils M, M', are connected respectively to the external circuits of the parallelly connected secondaries of two sets of series transformers, P, P'. The set of transformers P comprises three transformers whose primaries are in series in the transmission lines 7, 8 and 9 at the power station, while the set of transformers P' are similar transformers placed in the conductors 10, 11, 12 at the power station. Before considering in further detail what occurs at the receiving station and the necessities at that point, I will point out the operation of the apparatus thus far described at the power station. X indicates a fault in the form of a ground developed in the transmission line 12. Prior to the development of this fault the relay arm is in the balanced position shown in Figs. 1 and 3, and no current is flowing in the coils M or M' because the only currents passing over the transmission lines are the power currents, the algebraic sums of these currents being equal to zero. Before the development of the fault, also, all the circuit breakers are closed, while the tripping and closing circuits thereof are opened. Upon the development of the fault at X current will flow to the fault from the bus 3 taking two paths to the fault, one through the conductor 12 and the other through the conductor 9, bus 4 and distant end of conductor 12, the two paths uniting at the fault and flowing through the earth to the neutral a of the star connected power secondaries. These two currents produce currents in the neutrals of the two sets of series transformers at the power station and therefore current is supplied both to the coil M and to the coil M'. If the two transmission lines have equal conductivity, the current in the coil M' will be the greater, the extent of this being dependent upon the position of the fault along the conductor 12.

We can assume for purposes of considering the specific operation of the system, that the two lines are of equal conductivity, although this is not at all essential to my invention, it being one object of my invention to supply an operative and efficient means whatever the relative conductivity of the two lines. Where the lines differ in conductivity the coils M and M', or the two sets of transformers, are designed differently. If the fault X is not too close to the distant receiving station the current in coil M' will be sufficiently greater than that in the coil M to cause the lever L to be actuated to close the tripping circuit of the tripping coil c', thus opening the circuit breaker C'. The faulty line is thus disconnected at the power end. The action of the blocking and unblocking coils has already been described. If the fault X is so close to the receiving station that the currents in the two paths to the fault are so nearly equal that relay L is not actuated, then the circuit breaker C' will not be opened until after the circuit breaker D' at the other end of the faulty line has been opened as will be hereinafter explained. If circuit breaker D' has opened all the current flowing to the fault will flow through the conductor 12 and none of it through the conductor 9 which will cause a heavy current to flow through the coil M' and none through coil M, resulting in the opening of circuit breaker C'.

Referring now to the receiving station, I have shown similar sets of series transformers P², P³, acting upon the coils M and M' of the relay at the receiving station, which relay is in the specific embodiment of Fig. 1 identical with that shown at the power station and its parts are designated by the same reference letters. It will be noted that any current from the power station passing through the conductor 12 at the receiving station to the fault must necessarily be received through the bus 3, the conductor 9 and the bus 4. Therefore, any grounded current from the power station that would tend to produce a current in the coil M' of the relay at the receiving station will also cause an equal current in the coil M at the receiving station. It is necessary, therefore, to provide some additional means in order to actuate the relay in the receiving station. This I have provided in the case of Fig. 1 by employing at the receiving station power transformers whose primaries are star connected and whose secondaries are delta connected, the star connected primaries having a grounded neutral at a'. Upon the development of the fault at X the primary between the bus 4 and the grounded neutral no longer acts as a primary since both ends are grounded, but becomes a secondary which supplies current having an electro-motive-force that will oppose the flow of the grounded current from the power station through the line 9 and will add to the current flowing through the conductor 12 at the receiving station M. This current produced in the coil of the transformers B that is connected to the bus 4 is generated because the power current supplied to the other two primaries produces a secondary current in the three delta connected secondaries, and this current in the grounded transformer produces a re-transformation in the grounded primary. In the specific instance of Fig. 1, therefore, the relay at the receiving station is made to respond to and actuate the proper circuit breaker because the power transformer at the receiving station is so arranged and connected as to produce a current to ground, the electro-motive-force of which is so applied as to increase the neutral currents from the transformers $P^3$, while decreasing the neutral currents in the transformers $P^2$. In every case where only two transmission lines are employed it is necessary in order to obtain the proper action upon the circuit breakers at the receiving station, to produce a current in the receiving station that will coact with the currents produced by the flow of current from the power station through the receiving station to the fault.

In Fig. 2 I have illustrated another method of embodying the broad principle of my invention in order to indicate the scope thereof. In this figure I have shown only the receiving station, it being understood that the power station may be exactly as in Fig. 1. For purposes of explanation it will again be assumed that the fault is in conductor 12 at some point outside of the receiving station. The transformers $P^2$, $P^3$, the circuit breakers D and D' with their tripping and closing coils and circuits supplied by the battery E are or may be constructed and arranged as in Fig. 1. The power transformers in the system of Fig. 2 are illustrated as having delta connections both for their primaries and their secondaries, it being immaterial what connections of transformers are employed. In this case the two sets of parallel connected secondaries of the series transformers $P^2$, $P^3$, are oppositely connected together so that they have a single external circuit which will receive a current that is a resultant of the currents produced by each set of secondaries. Where there is no fault on the line neither set of secondaries will supply any current to the external circuit. If, however, a fault has developed in the conductor 12, then the current passing through conductor 9, bus 4 and conductors 12 to the fault will pass through the two transformers and will tend to cause equal currents from the two sets of secondaries, which currents are of opposite phases. Inasmuch as the two transformers are connected oppositely to their external circuit, a single resulting current will be supplied to that circuit. As the two sets of transformers are connected oppositely to each other, the current developed in the circuit connecting them will have a direction depending upon whether the faulty conductors are in one line or the other. I take advantage of this fact to connect to the external circuit of these sets of transformers, coils $M^2$ and $M^3$ in which the currents generated by the two sets of transformers unite as a resultant current so that any apparatus upon which these coils act will be acted upon coöperatively by the two currents produced by the two sets of transformers. The exact phase of the current in these coils is determined by the fact that the fault is in the line 12. Six possible phases of current can be found in these coils, depending upon which line is at fault and in which conductor of that line the fault has developed. Opposed to these coils are coils Q, Q' which are supplied with a current having a definite phase relation to the normal phase of the grounded conductor, the phase of the current in these coils being independent of the line in which the fault has developed, thus the phase of the current in coils $M^2$ and $M^3$, due to the fault in the line 12 is exactly opposite to that which would occur if the fault had developed in the line 9, whereas I so supply the coils Q and Q' that the phase of the current is exactly the same whether the fault be in the conductor 12 or the conductor 9. I connect one set of these coöperating coils as $M^2$, $M^3$ in reverse series, while connecting the other pair of coils as Q, Q' in straight series, one set of coils as $M^2$, $M^3$ may be secured to the pivoted relay arm $L^1$, while the other set as Q, Q' is fixed in position to coact respectively with the coils $M^2$, $M^3$. With the relative phases, as above described, it is obvious that whatever the fault developed, one of the coils $M^2$, $M^3$ will be attracted by the adjacent coil Q, Q', while the other of said coils will be repulsed by the adjacent coil. While in this specific embodiment I have shown two sets of coils, it is obvious that the two sets only act cumulatively when applied to a single relay arm L', and that either of the sets shown, $M^2$ and Q or $M^3$ and Q', operate to produce opposite movements of the relay arm according to which line is at fault.

I have illustrated in Fig. 2 one way of supplying to the coils Q, Q' a current that will have a definite phase with relation to the normal phase of the grounded conductor. The means I have shown involve the production of a current in the coils Q, Q' that is determined by the flow of current to the fault, although this is not an essential to the provision of such a current.

R is a set of potential transformers having star connected primaries and delta connected secondaries. The neutral of the star is connected to ground by conductor $a^2$, in which conductor is placed a limiting resistance $r'$ and a series transformer $r$. The secondary of this transformer supplies the coils Q, Q'. When the arm is in normal condition there is no current in the conductor $a^2$ and therefore no current is supplied to the coils Q, Q'. Upon the development of a fault in any conductor, thus short-circuiting one of the three primaries of the transformer set R, the current produced in the three secondaries by induction from the two ungrounded primaries causes a re-transformation of energy to cause the grounded primary to act as a secondary and supply a current through the faulty conductor, thence through the ground and through the neutral $a^2$. This current causes a current to be supplied by the secondary of transformer $r$ thereby supplying a current to coils Q, Q' whose phase is definitely related to that of the grounded conductor. Thus in the present instance with a ground assumed on conductor 12, the bus 4 is the ground bus and the primary between that bus and the center of the star will be the one that supplies current to coils Q, Q' and this current will necessarily have a definite phase relation to the normal phase of conductor 12. If the fault had developed on conductor 9 instead of on conductor 12 it would not affect the phase of the current produced by transformer $r$.

The relay arm L' by its movement in one direction or another controls one or other of the tripping circuits exactly as in the case of the relay in Fig. 1. Inasmuch as the current flowing from the power end through the receiving station to the fault passes through the two circuit breakers D and D' in series, and also through the sets of transformers P² and P³ in series, the opening of either circuit breaker stops the flow of its current and therefore when the proper circuit-breaker has been actuated by the movement of the arm L' there is no longer any grounded current to produce currents in coils M² and M³, so that there is no danger of the arm moving in the opposite direction and opening both circuit breakers. There is, therefore, no necessity for blocking the relay arm L at the receiving station.

It will be understood that while I have only described two specific embodiments of my invention, other modifications may be made without departing from my invention, as set forth in the appended claims. I have shown two embodiments in order to illustrate that in accordance with my broad invention it is immaterial whether the current produced at the receiving station (having a definite phase relation to the normal phase of the grounded conductor) co-acts with the two currents produced by the flow of current to ground from the power end, by causing said two currents to be of unequal value or by causing them to act selectively according to their phase.

What I claim as new and desire to secure by Letters Patent is:

1. Two polyphase transmission lines connected at each end, a circuit breaker in each, a relay arranged to actuate either of said circuit breakers but normally ineffective, means for producing currents corresponding respectively to the algebraic sum of the currents in the two transmission lines, and means for causing said currents to simultaneously act upon said relay.

2. Two polyphase transmission lines connected at each end, a circuit breaker in each, means dependent upon the flow of current to a fault for producing currents corresponding respectively to the algebraic sums of the currents in the two transmission lines, and means for causing said currents to coöperatively act to open the circuit breaker in the faulty line without affecting the other.

3. Two transmission lines connected at each end, a circuit breaker in each, conductors normally without current, means for producing two currents determined by the flow of current to a fault in a transmission line and means supplying said currents to said conductors, and for causing said currents to coöperatively act to open the circuit breaker in the faulty line without affecting the other.

4. The combination with a polyphase power station, a receiving station, and two transmission lines connected to the buses at each station, of a series transformer in each conductor of each line, the transformers having their secondaries connected in parallel, a coil in the circuit of each set of connected secondaries, a relay oppositely acted upon by said coils, and a circuit breaker in each transmission line in operative relation to said relay.

5. Two polyphase transmission lines connected at each end, a circuit breaker in each, and a relay arranged to operate either breaker and to be acted upon oppositely by currents each corresponding in value to the algebraic sum of the currents of the phases of one of the transmission lines.

6. Two polyphase transmission lines, a circuit breaker in each, tripping circuits therefor, a relay having positions for closing each tripping circuit and normally closing neither, and opposing coils acting upon the relay each arranged to receive a current corresponding in value to the algebraic sum of the currents of the phases of one of the transmission lines.

7. Two polyphase transmission lines, a circuit breaker in each, tripping circuits therefor, a relay having positions for closing each tripping circuit and normally closing neither, opposing coils acting upon the relay each arranged to receive a current corresponding in value to the algebraic sum of the currents of the phases of one of the transmission lines, and means actuated by its movement to either operative position for holding it from movement to the other operative position.

8. Two polyphase transmission lines connected in parallel, a circuit breaker in each at the receiving end, means for producing currents determined by the flow of current to a fault in any one conductor from the power end, means for producing another current having a phase dependent upon which conductor is at fault and definitely related to the normal phase of a faulty conductor, and means for causing all of said currents to co-act to actuate the circuit breaker in the faulty line.

9. Two polyphase transmission lines connected in parallel, a circuit breaker in each at the receiving end, means for producing currents determined by the flow of current to a fault in any one conductor from the power end, means determined by the flow of current to a fault for producing another current having a phase dependent upon which conductor is at fault and definitely related to the normal phase of a faulty conductor, and means for causing all of said currents to co-act to actuate the circuit breaker in the faulty line.

10. Two polyphase transmission lines connected in parallel, a circuit breaker in each at the receiving end, means for producing currents determined by the flow of current to a fault in any one conductor from the power end, means for producing another current having a phase dependent upon which conductor is at fault and definitely related to the normal phase of a faulty conductor, a relay operatively related to both circuit breakers, and means for causing all of said currents to conjointly act upon said relay.

11. Two polyphase transmission lines connected in parallel, a circuit breaker in each at the receiving end, means for producing currents determined by the flow of current to a fault in any one conductor from the power end, means responsive to the flow of current to a fault for producing another current having a phase dependent upon which conductor is at fault and definitely related to the normal phase of the faulty conductor, a relay operatively related to both circuit breakers, and means for causing all of said currents to conjointly act upon said relay.

12. Two polyphase transmission lines connected in parallel, a circuit breaker in each at the receiving end, means for generating a current at the receiving end flowing to a fault, means for producing a current responsive to said current and another current responsive to that flowing to the fault from the power end, and means for causing said produced currents to coact to produce a force acting selectively upon said circuit breakers.

13. Two polyphase transmission lines connected in parallel, a circuit breaker in each at the receiving end, means for generating a current at the receiving end flowing to a fault and having a definite phase relation to the phase of the faulty conductor, means for producing a current responsive to said current and another current responsive to that flowing to the fault from the power end, and means for causing said produced currents to coact to produce a force acting selectively upon said circuit breakers.

14. Two polyphase transmission lines connected in parallel, a circuit breaker in each at the receiving end, means for generating a current at the receiving end flowing to a fault, means for producing a current responsive to said current and another current responsive to that flowing to the fault from the power end, two coils respectively receiving said produced currents, and apparatus operatively related to both circuit breakers and acted upon oppositely by said coils.

15. Two polyphase transmission lines connected in parallel, a circuit breaker in each at the receiving end, a series transformer in each conductor of each line at the receiving station, the secondaries of each set being connected in parallel, a permanent ground at the power end of the system, star-delta connected transformers at the receiving station, the star having a grounded neutral, and electro-responsive devices receiving the currents from said secondaries and in operative relation to both said circuit breakers.

16. Two polyphase transmission lines connected in parallel, a circuit breaker in each at the receiving end, a series transformer in each conductor of each line at the receiving station, the secondaries of each set being connected in parallel, a permanent ground at the power end of the system, star-delta connected power transformers at the receiving station, the star having a grounded neutral, electro-responsive devices receiving the currents from said secondaries and in operative relation to both said circuit breakers.

17. Two polyphase transmission lines connected in parallel, a circuit breaker in each at the receiving end, a series transformer in each conductor of each line at the receiving station, the secondaries of each set being connected in parallel, power transformers at the power end having star connected secondaries with a grounded neutral, star-delta connected transformers at the receiving station, the star having a grounded neutral, and electro-responsive devices receiving the currents from said secondaries and i noperative relation to both said circuit breakers.

18. Two polyphase transmission lines connected in parallel, a circuit breaker in each at the receiving end, a series transformer in each conductor of each line at the receiving station, the secondaries of each set being connected in parallel, a permanent ground at the power end of the system, star-delta connected transformers at the receiving station, the star having a grounded neutral, coils connected respectively to the said two sets of secondaries, and a relay oppositely acted upon by said coils and in operative relation with both circuit breakers.

19. Two polyphase transmission lines connected in parallel, a circuit breaker in each at the receiving end, a series transformer in each conductor of each line at the receiving station, the secondaries of each set being connected in parallel, power transformers at the power end having star connected secondaries with a grounded neutral, star-delta connected transformers at the receiving station, the star having a grounded neutral, coils connected respectively to said two sets of secondaries, and a relay oppositely acted upon by said coils and in operative relation with both circuit breakers.

20. A polyphase power station, a receiving station, a transmission system between the stations made up of two parallel lines connected together at both stations, circuit breakers in each line at the receiving station, means for producing unequal currents flowing to a fault through the conductors of the two lines at the receiving station, and coils receiving currents determined by said unequal currents, said coils being in opposite operative relation to said circuit breakers.

21. A polyphase power station, a receiving station, a transmission system between the stations made up of two parallel lines connected together at both stations, circuit breakers in each line at the receiving station, means for producing unequal currents flowing to a fault through the conductors of the two lines at the receiving station, coils receiving currents determined by said unequal currents, and a relay oppositely acted upon by said coils and operatively related to both circuit breakers.

22. A polyphase power station, a receiving station, a transmission system between the stations made up of two parallel lines connected together at both stations, circuit breakers in each line at the receiving station, means for producing unequal currents flowing to a fault through the conductors of the two lines at the receiving station, series transformers at the receiving station in each conductor of each line, the secondaries of each set of transformers being connected in parallel, and coils in operative relation to said circuit breakers each connected to the circuit of one of the sets of secondaries.

23. A polyphase power station, a receiving station, a transmission system between the stations made up of two parallel lines connected together at both stations, circuit breakers in each line at the receiving station, means for producing unequal currents flowing to a fault through the conductors of the two lines at the receiving station, series transformers at the receiving station in each conductor of each line, the secondaries of each set of transformers being connected in parallel, and coils in opposite operative relation to both circuit breakers each connected to the circuit of one of the sets of secondaries.

24. A polyphase power station, a receiving station, a transmission system between the stations made up of two parallel lines connected together at both stations, circuit breakers in each line at the receiving station, means for producing unequal currents flowing to a fault through the conductors of the two lines at the receiving station, series transformers at the receiving station in each conductor of each line, the secondaries of each set of transformers being connected in parallel, a relay controlling both circuit breakers, and coils oppositely acting upon said relay and connected each to the circuit of one of the two sets of secondaries.

25. A polyphase power station and two parallel transmission lines therefrom, a circuit breaker in each line at the power station, a series transformer in each conductor of each line at the power station, each set of transformer secondaries being connected in parallel, a coil connected to each set of secondaries, and a relay oppositely acted upon by said coils controlling both circuit breakers.

26. Two polyphase transmission lines connected in parallel, series transformers connected in each conductor of each line, each set of transformer secondaries being connected in parallel, a coil in the circuit of each set of secondaries, a pivoted arm oppositely acted upon by said coils, a circuit breaker in each transmission line, and tripping circuits therefor closed respectively by opposite movements of said arm.

27. Two polyphase transmission lines connected in parallel, series transformers connected in each conductor of each line, each set of transformer secondaries being connected in parallel, a coil in the circuit of each set of secondaries, a pivoted arm oppositely acted upon by said coils, a circuit breaker in each transmission line, tripping circuits therefor closed respectively by opposite movements of said arm, means holding said arm from movement to either one of its operative positions when moved to the other of said positions, and a coil for actuating said means energized by the movement of the arm to close the tripping circuit.

28. Two polyphase transmission lines connected in parallel, series transformers connected in each line, each set of transformer secondaries being connected in parallel, a coil in the circuit of each set of secondaries, a pivoted arm oppositely acted upon by said coils, a circuit breaker in each transmission line, tripping circuits therefor closed respectively by opposite movements of said arm, means holding said arm from movement to either one of its operative positions after being moved to the other of said positions, a coil for actuating said means energized by the movement of the arm to close the tripping circuit, a closing circuit for each circuit breaker, and means controlled by the completion of said closing circuit for releasing said means.

29. A power station, two polyphase transmission lines supplied thereby and connected together at each end, circuit breakers in each line at each end thereof, a relay at each end of the system controlling both circuit breakers thereat, two coils for each relay acting oppositely thereon, and means for supplying to the respective coils currents corresponding to the algebraic sums of the currents in the respective transmission lines at the ends of the lines at which the respective coils are located.

30. A power station, two polyphase transmission lines supplied thereby and connected together at each end, circuit breakers in each line at each end thereof, a relay at each end of the system controlling both circuit breakers thereat, two coils for each relay acting oppositely thereon, means for supplying to the respective coils currents corresponding to the algebraic sums of the currents in the respective transmission lines at the ends of the lines at which the respective coils are located, and means responsive to the flow of current to a fault for producing an inequality of the algebraic sums of the currents in the transmission lines at the end distant from the power station.

31. A power station, two polyphase transmission lines supplied thereby and connected together at each end, circuit breakers in each line at each end thereof, a relay at each end of the system controlling both circuit breakers thereat, two coils for each relay acting oppositely thereon, a series transformer in each conductor of each line and at each end thereof, each of the four sets of transformer secondaries being connected in parallel, and circuits operatively relating the several relay coils to the several sets of connected secondaries.

32. A power station, two polyphase transmission lines supplied thereby and connected together at each end, circuit breakers in each line at each end thereof, a relay at each end of the system controlling both circuit breakers thereat, two coils for each relay acting oppositely thereon, a series transformer in each conductor of each line and at each end thereof, the four sets of transformer secondaries being connected in parallel, circuits operatively relating the several relay coils to the several sets of connected secondaries, and means responsive to the flow of current to a fault for producing an inequality of the currents in the circuits of the two sets of secondaries at the end distant from the power station.

33. A power station, two polyphase transmission lines supplied thereby and connected together at each end, circuit breakers in each line at each end thereof, a relay at each end of the system controlling both circuit breakers thereat, two coils for each relay acting oppositely thereon, a series transformer in each conductor of each line and at each end thereof, each of the four sets of transformer secondaries being connected in parallel, circuits operatively relating the several relay coils to the several sets of connected secondaries, and star-delta connected transformers at the end distant from the power station, the star primaries having a grounded neutral.

34. Two parallel polyphase transmission lines, a power station and a receiving station connected thereby, a circuit breaker in each line at the receiving station, means for producing currents corresponding in value respectively to the algebraic sums of the currents of the two lines at the receiving station, means for producing a current of definite phase at the receiving station, and means for causing said currents to operatively act to cause the opening of the circuit-breaker of the faulty line.

In testimony whereof, I have signed my name to this specification, in the presence of two subscribing witnesses.

LLOYD CARLTON NICHOLSON.

Witnesses:
 FRANCES B. H. PAINE,
 R. C. DOWNING.